(12) United States Patent
Wuidart (10) Patent No.: US 8,718,552 B2
(45) Date of Patent: May 6, 2014

(54) CONTACTLESS COMMUNICATION WITH AUTHORIZATION BY HUMAN CONTACT

(75) Inventor: Luc Wuidart, Pourrieres (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 201 days.

(21) Appl. No.: 13/316,242

(22) Filed: Dec. 9, 2011

(65) Prior Publication Data

US 2012/0149443 A1    Jun. 14, 2012

(30) Foreign Application Priority Data

Dec. 10, 2010    (FR) ...................................... 10 60363

(51) Int. Cl.
*H04B 1/59*    (2006.01)

(52) U.S. Cl.
USPC ........................................................ 455/41.1

(58) Field of Classification Search
USPC ............ 455/41.1, 41.2, 84, 575.7, 556.1, 269
See application file for complete search history.

(56) References Cited

U.S. PATENT DOCUMENTS

| 4,063,111 | A | 12/1977 | Dobler et al. |
| 6,225,711 | B1 | 5/2001 | Gupta et al. |
| 6,588,660 | B1 | 7/2003 | Buescher et al. |
| 7,319,396 | B2 | 1/2008 | Homanfar et al. |
| 7,995,965 | B2 | 8/2011 | Wuidart |
| 8,237,550 | B2 * | 8/2012 | Reichert et al. ............ 340/10.41 |
| 8,238,840 | B2 * | 8/2012 | Iio et al. .......................... 455/76 |
| 2003/0116634 | A1 | 6/2003 | Tanaka |
| 2003/0132301 | A1 | 7/2003 | Selker |
| 2005/0242950 | A1 | 11/2005 | Lindsay et al. |
| 2006/0283960 | A1 | 12/2006 | Top |
| 2007/0026826 | A1 | 2/2007 | Wilson |
| 2007/0194926 | A1 | 8/2007 | Bayley et al. |
| 2008/0061151 | A1 | 3/2008 | Phillips |
| 2008/0256642 | A1 | 10/2008 | Hachey |
| 2010/0079289 | A1 | 4/2010 | Brandt et al. |
| 2010/0123581 | A1 | 5/2010 | Hatfield et al. |
| 2010/0308976 | A1 | 12/2010 | Seban et al. |
| 2010/0328045 | A1 * | 12/2010 | Goto et al. ................... 340/10.4 |
| 2012/0088547 | A1 * | 4/2012 | Lee et al. ................... 455/556.2 |

FOREIGN PATENT DOCUMENTS

| FR | 2802947 A1 | 6/2001 |
| FR | 2828953 A1 | 2/2003 |
| JP | 58-9980 A | 1/1983 |

* cited by examiner

*Primary Examiner* — Blane J Jackson
(74) *Attorney, Agent, or Firm* — Seed IP Law Group PLLC (57) ABSTRACT

A transponder comprising a resonant circuit, comprising an antenna and a capacitor, and at least one memory connected to the resonant circuit via an intermediate circuit, characterized in that the intermediate circuit comprises at least one contact zone for receiving a portion of human body, so that the positioning of a portion of human body on a contact zone modifies the intermediate circuit, capable of switching from a first state in which it does not allow the memory to be read and/or written to a second state in which it allows the memory to be read and/or written when the resonant circuit of the transponder is contactlessly powered by a reader.

19 Claims, 9 Drawing Sheets

CONTACTLESS COMMUNICATION WITH AUTHORIZATION BY HUMAN CONTACT

BACKGROUND

1. Technical Field

The present document relates to an electromagnetic transponder, that is to say a transmitter-receiver device capable of interchanging data contactlessly and wirelessly. It also relates to a system comprising a contactless reader and such a transponder. It is particularly suitable for a transponder with no standalone power supply, of the contactless integrated-circuit card type. Finally, it relates to a secure method of contactless data interchange based on such a transponder.

2. Description of the Related Art

Certain contactless portable objects, such as certain integrated circuit cards called contactless cards, operate by remote power supply, in other words by contactless power supply. Such an object is activated in the presence of a certain electromagnetic field produced and sent by a reader with which it is supposed to communicate. Hereinafter it will be said that such an object is powered contactlessly by a reader when it is in the electromagnetic field generated by a reader, at its resonance frequency. Such an electromagnetic field transmits to the object the energy for the object to operate while conveying the data interchanged with the reader, during a communication called a radiofrequency communication, or more simply called contactless communication, as opposed to the communications that require a physical electrical contact with a reader via an electrical connector.

An electromagnetic field is therefore used both for powering such a contactless object and for establishing a communication between a reader and the contactless object. Since such a communication is established without physical contact between the two communicating devices, there is a risk that a reader enters into communication with a contactless portable object without the knowledge of its owner, for fraudulent purposes or simply by accident. This risk is very problematic because such contactless objects often contain sensitive data, such as data associated with the private life of its owner, and can be used for applications in which great security is desired, such as the medium for personal information in a passport, a health card, or for making electronic payments.

The contactless portable objects may therefore be subjected to malicious attacks for the purpose of gathering personal information from their owner, or for carrying out operations such as electronic signatures or electronic payments without their knowledge.

To reduce the risk explained above, document U.S. Pat. No. 6,588,660 describes a contactless integrated circuit card, also called smart card, furnished with an antenna, the structure of which makes it inactive at the usual resonance frequency of contactless smart cards. This card further comprises a housing designed so that a user places his finger in order to create an effect that then modifies the properties of the antenna, more precisely its internal interference parasite capacitor, and consequently its resonance frequency, so that it becomes activatable at the usual and standardized communication frequencies of contactless smart cards. This solution is therefore meant to prevent frauds since an intentional action of the holder of the contactless smart card is necessary to allow the card to be powered and to operate normally. However, such an approach has several drawbacks. First, the effect obtained by the placing of a finger on the housing provided on the card is very variable; notably it depends on the ambient humidity and on individuals. In point of fact, the resonance frequency of the antenna of the card depends precisely on its capacitance. The result of this is that the real resonance frequency of such a card after the placing of a finger on the housing provided remains imprecise and variable and the performance of such a card is greatly compromised because of this uncertainty, which might make it difficult or even impossible to use in certain conditions. Moreover, there are attacks which consist in attempting a communication with a transponder by scanning several frequencies until a response is obtained from the transponder. Such a smart card remains totally vulnerable to such attacks.

Thus, there is a need for a contactless communication solution that does not comprise all or some of the drawbacks mentioned above.

More precisely, there is a first need for a solution allowing a secure and reliable contactless communication.

Moreover, there is a second need for a solution allowing a contactless communication of little bulk, compatible with use within an integrated circuit card, of small dimensions like the format of a bank card as standardized.

BRIEF SUMMARY

Accordingly, one embodiment of the disclosure is a transponder comprising a resonant circuit, comprising an antenna and a capacitor, and at least one memory connected to the resonant circuit via an intermediate circuit, characterized in that it comprises at least one contact zone for receiving a portion of human body, so that the positioning of a portion of human body on a contact zone modifies the intermediate circuit, capable of switching from a first state in which it does not allow the memory to be read and/or written to a second state in which it allows the memory to be read and/or written when the resonant circuit of the transponder is contactlessly powered by a reader.

The resonant circuit may have characteristics that allow it to be powered contactlessly around a resonance frequency, this resonance frequency remaining the same in both states of the intermediate circuit.

The resonant circuit may begin to resonate and induce a voltage difference between its high terminal and low terminal when the transponder is contactlessly powered by a reader, in both states of the intermediate circuit.

The intermediate circuit may comprise a contact zone comprising a contact pad on which the positioning of a portion of human body has a capacitive effect, or comprising two adjacent contact pads on which the positioning of a portion of human body has a resistive effect.

The intermediate circuit may comprise at least one contact zone on which simply the contact of a portion of human body is sufficient for the switch from its first state to the second state when its resonant circuit is contactlessly powered by a reader, or the intermediate circuit may always be in the first state when no portion of human body is placed on its at least one contact zone and in the second state when a portion of human body remains placed on its contact zone and its resonant circuit is contactlessly powered by a reader.

The contact zone may be tied to an intermediate terminal so that the positioning of a portion of human body on the contact zone causes the changing of the voltage of this intermediate terminal.

The transponder may comprise at least one switch able to pass from an open to a closed position or vice versa by the positioning of a portion of human body on the contact zone.

The transponder may comprise at least one flip-flop or a device comprising at least one logic gate tied directly or indirectly to the intermediate terminal in such a way as to change an output value of the flip-flop or of the device comprising at least one logic gate in the presence of a portion of human body on the contact zone.

The transponder may comprise a return pathway from the output of the flip-flop or of the device comprising at least one logic gate linked to a capacitor making it possible to maintain its charge after the positioning of a portion of human body on the contact zone.

The transponder may comprise a photodiode so as not to permit switchover to the second state of the intermediate circuit in which it allows reading from and/or writing to the memory when the resonant circuit of the transponder is contactlessly powered by a reader except in the case of the presence of light and of positioning of a portion of human body on a contact zone of the intermediate circuit.

The transponder may comprise an indicator which makes it possible to display that the transponder is contactlessly powered by a reader and/or to display that positioning of a portion of human body on a contact zone of the intermediate circuit has been or is taken into account.

The transponder may be a contactless or dual integrated circuit card.

The disclosure also relates to a telephone comprising a transponder as described above.

The disclosure also relates to a system comprising a reader comprising a circuit oscillating at a resonance frequency, and a transponder as described above of which the resonant circuit has a resonance frequency tuned to that of the reader.

The disclosure also relates to a method of contactless communication between a reader and a transponder, which includes the following steps:

a. transmission of an electromagnetic field by the reader;

b. resonance of the resonant circuit of the transponder inducing the contactless powering of the transponder, which is in a first state in which it does not allow the reading and/or writing of the memory and transmits no datum or random data;

c. positioning of a portion of human body on a contact zone of the intermediate circuit of the transponder and switch to a second state of the transponder;

d. interchange of data between the memory of the transponder and the reader.

The interchange of data may comprise the sending of data relating to a payment and/or an authentication, and/or a digital signature to the reader, and/or the sending of other secure data.

BRIEF DESCRIPTION OF THE SEVERAL VIEWS OF THE DRAWINGS

These features and advantages of the present disclosure will be explained in detail in the following description of particular embodiments made in a non-limiting manner with respect to the attached figures amongst which.

DETAILED DESCRIPTION

Figure 1:
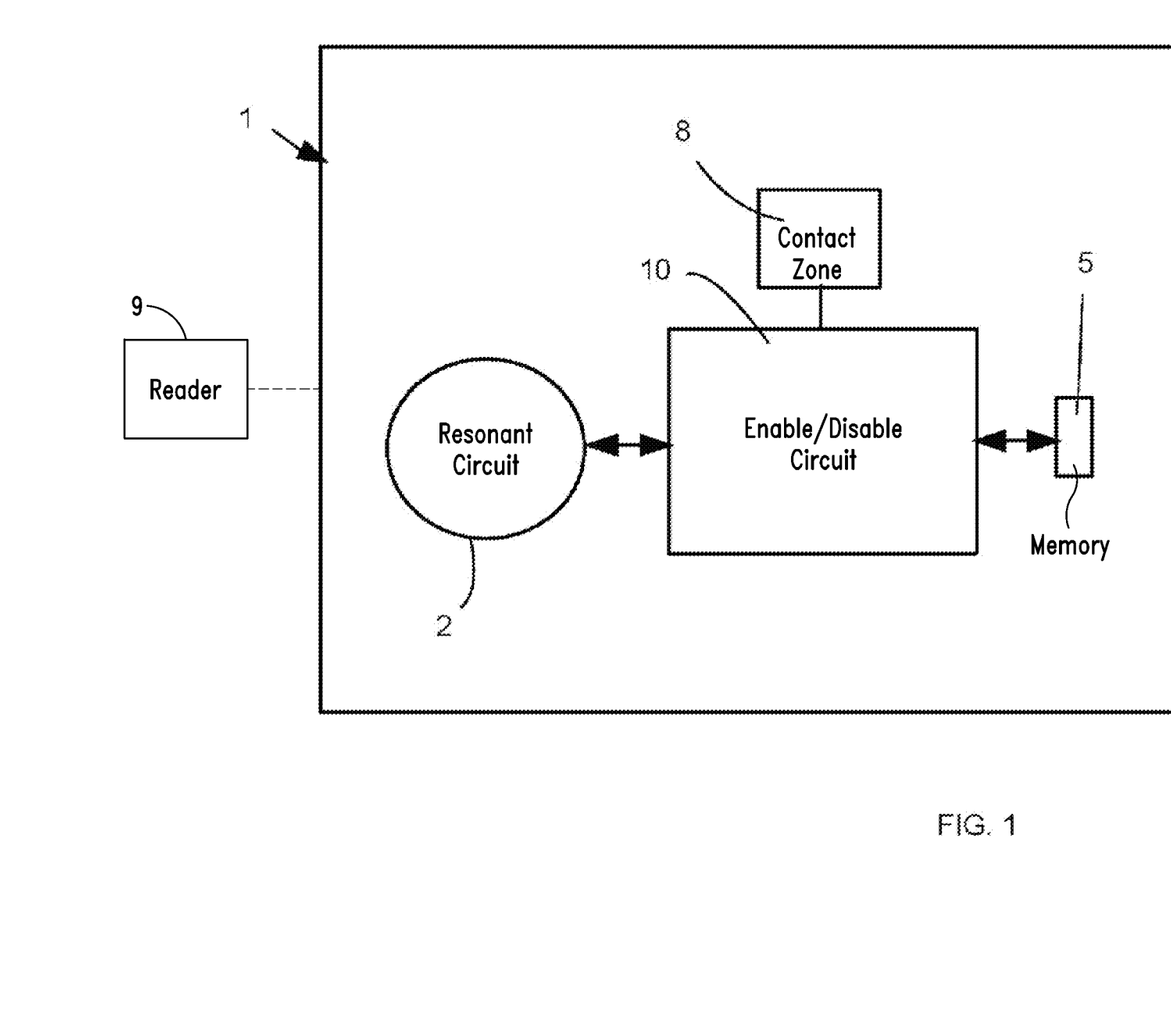
FIG. 1 represents schematically a transponder according to one embodiment of the disclosure.

The concept of the adopted solution is illustrated in FIG. 1. It provides a transponder 1 comprising a resonant circuit 2, which includes an antenna and a capacitor, at least one memory 5, and an intermediate circuit 10 between the resonant circuit 2 and memory 5 and having a contact zone 8 for receiving the contact of a portion of human body, or similar conductive object. Without such a contact, a use of the transponder 1 is not possible, that is to say more precisely that a data interchange between the memory 5 of the transponder 1 and a reader is prohibited or degraded so that the normal use of the transponder 1 to fulfil a certain application is not possible. Therefore an intentional and precise action on the transponder 1 enables its use, which removes the risk of fraudulent transaction without the knowledge of the holder of the transponder 1.

For the purposes of simplicity and clarity, the same references will be used in the various figures relating to various embodiments for similar elements.

Figure 2:
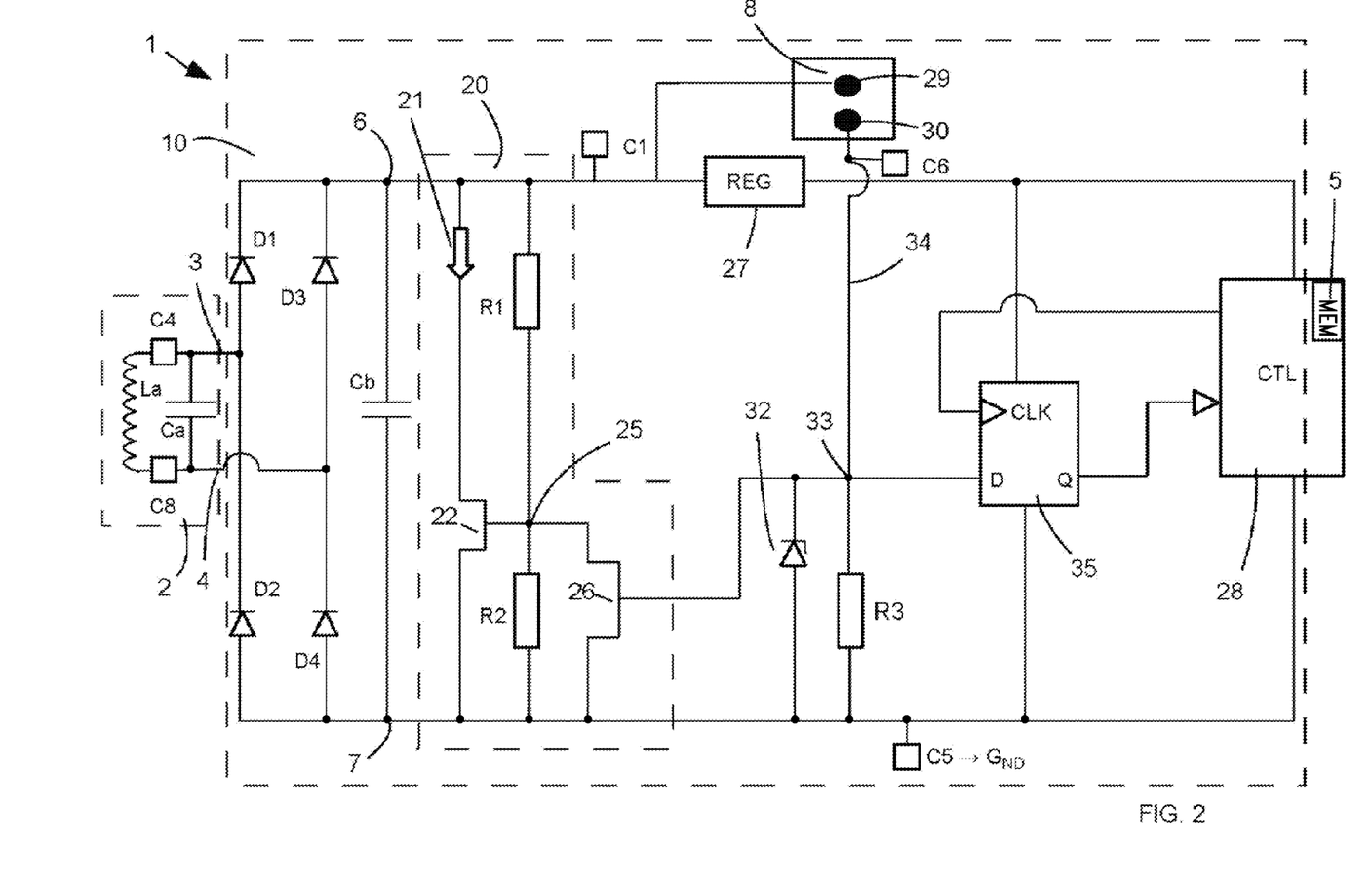
FIG. 2 represents schematically the electronic circuit of a transponder according to a first embodiment of the disclosure.
Figure 3:
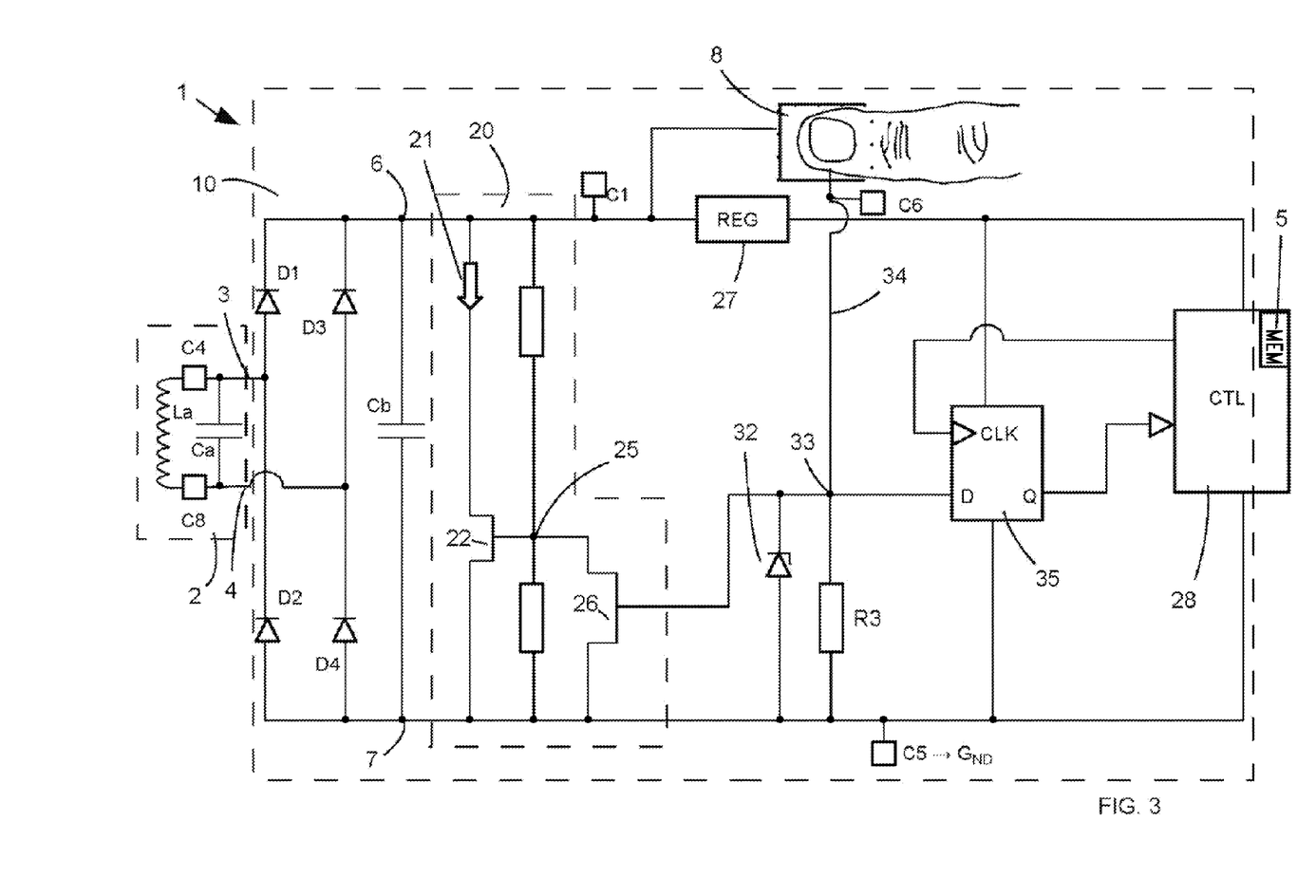
FIG. 3 represents schematically the electronic circuit of a transponder during a transaction authorized by its holder according to the first embodiment of the disclosure.

FIGS. 2 and 3 represent a transponder 1 according to a first embodiment, which is shown as a contactless integrated circuit card of the payment card type.

The transponder 1 of FIGS. 2 and 3 comprises a resonant circuit 2, formed by an antenna and a capacitor, which form an oscillating circuit comprising an inductor La placed in parallel with a capacitor Ca. This oscillating circuit is designed to capture a magnetic field generated by a reader 9. In the presence of a magnetic field the frequency of which matches the resonance frequency of the oscillating circuit of the transponder 1, a voltage difference at the terminals 3 and 4 of the resonant circuit 2 is generated, which allows on the one hand the contactless powering of the transponder and, on the other hand, the implementation of a contactless data interchange between a memory 5 of the transponder 1 and the reader 9, via the resonant circuit 2 and an intermediate circuit 10 placed on the transponder, between its resonant circuit 2 and the memory 5.

The terminals 3, 4 of the resonant circuit 2, which correspond to the terminals of the capacitor Ca, are linked to two terminals of alternating input of a rectifier bridge consisting of four diodes D1, D2, D3, D4. As a variant, this diode bridge may be replaced by an equivalent device. A capacitor Cb is connected to the rectified output terminals of high voltage 6 and low voltage 7 of the rectifier bridge so as to store energy and smooth the rectified voltage delivered by the rectifier bridge. Thus, when the transponder is powered contactlessly by a reader 9, a voltage difference appears between its two terminals, the high terminal 6 and the low terminal 7. Then, the power supply voltage of the transponder, rectified by the rectifier bridge, smoothed by the capacitor Cb, and regulated by a voltage regulator 27 (REG), powers the electronic circuits of the transponder 1, including a microcontroller 28 which manages the memory 5. As a variant, the upstream portion of the intermediate circuit 10, the function of which is a processing of the voltage, could be different, simplified, for example according to the disclosure of U.S. Pat. No. 7,995, 965, which is incorporated herein by reference in its entirety.

An intermediate branch 34 connected between the two voltage terminals, high voltage 6 and low voltage 7, of the transponder, upstream of the voltage regulator 27, comprises two contact pads 29, 30, situated close to one another and forming an opening of this intermediate branch in a first state of not authorizing the use of the transponder, represented in FIG. 2. A resistor R3 is also placed on this intermediate branch 34, of which a first intermediate terminal 33, situated between the contact pads 29, 30 and the resistor R3, is linked to a "visual indicator" device 20, which will be described below. A Zener diode 32 is placed in parallel with this resistor R3, between the intermediate terminal 33 and the low-voltage terminal 7, in order to limit the maximum voltage reached at the intermediate terminal 33, which could cause damage to a switch 26 of the "visual indicator" device 20 and to the input stage D of a flip-flop 35.

A flip-flop 35 is placed between the intermediate terminal 33 and the microcontroller 28, of which a synchronization clock input CLK is linked to the clock of the microcontroller 28. The input D of the flip-flop 35 is therefore linked to the potential of the intermediate terminal 33 and its output Q is linked to the microcontroller 28.

According to this first embodiment, the intermediate circuit 10 of the transponder comprises a visual indicator device 20, linked to the high and low output terminals 6, 7 of the capacitor Cb. It comprises a visual indicator 21, in series with a first switch 22, between the two terminals 6, 7 of the capacitor Cb, and two resistors R1, R2 in series on a parallel branch between the high terminal 6 and the low terminal 7 of the transponder of which one terminal of intermediate potential 25, between the two resistors R1, R2, is linked to the first switch 22 to control its opening or its closure. Finally, a second switch 26 is placed between an intermediate terminal 25 and the low-voltage terminal 7. In this embodiment, these two switches are transistors of the N-channel MOS type. As a variant, this visual indicator device 20 could be positioned differently within the intermediate circuit 10, for example downstream of the voltage regulator 27.

The operation of this transponder 1 according to the first embodiment will now be explained. When there is no transaction, the transponder 1 is for example in the pocket of its holder and its electric circuit is that shown in FIG. 2. When it is not in the presence of an electromagnetic field of a reader, the transponder receives no electric power supply and therefore remains passive. When it is powered contactlessly by a reader, malicious or not, its resonant circuit 2 is capable of beginning to resonate, when the transmission frequency of the reader matches its resonance frequency, and a potential difference may therefore appear at the high and low terminals 6, 7 of the transponder. In this configuration, a high voltage appears at the first intermediate terminal 25 which induces the closure of the first switch 22, that is to say making it conductive. The visual indicator 21, which may be a diode of the LED type depending on the embodiment, then switches on, indicating that the transponder is powered contactlessly by a reader. In this configuration, the intermediate terminal 33 is not linked to the high voltage 6 of the transponder and the input D of the flip-flop takes a first low value (usually 0). Consequently, its output Q also takes a low value, received by the microcontroller 28, which interprets it as an unauthorized transaction situation. In such a case, the microcontroller 28 is programmed to prohibit any data interchange between its memory 5 and the reader, or even to transmit random unusable data to it. The transponder is therefore clearly in a first state of not authorizing its use. In this way, the security of the transponder is guaranteed and no fraud is possible without the knowledge of its holder. As a comment, this solution has the advantage that a reader can detect a transponder, since the latter begins to resonate, but cannot detect that it is a transponder fitted with a security solution as explained. This makes it possible to prevent the defrauder from being informed of the detection and of the neutralization of his attack.

If the holder of the transponder really wishes to carry out a transaction, he places a finger on the contact zone 8 arranged on the surface of the transponder, so as to cover the two contact pads 29, 30, as shown in FIG. 3. This intentional action of the holder of the card modifies the electric circuit of the transponder by closing the intermediate branch 34, the intermediate terminal 33 of which then takes a higher voltage value sufficient to modify the output of the flip-flop Q to a second high value (usually 1), when the clock signal so allows, which is interpreted by the microcontroller 28 as an authorized transaction situation. Access to its memory 5 then occurs normally and the planned application of the transponder is carried out securely. The transponder is then in a second state of authorizing its use.

As a comment, when the user removes his finger, the voltage of the intermediate terminal 33 is again modified, which makes the flip-flop 35 return to its initial low state and again supply the microcontroller with an output signal Q at its first low value, which prohibits the transaction. Thus, in this first embodiment as described, the user must keep his finger on the provided contact zone 8 throughout the transaction.

At the same time, the voltage appearing at the first intermediate terminal 33 when the transponder 1 is in its state of authorizing its use, closes the second switch 26, that is to say that it makes it conductive so as to establish an electric connection between the intermediate terminal 25 and the low voltage 7 of the transponder, which induces the opening of the first switch 22. The visual indicator 21 then switches off and thus fulfils a second function indicating that the communication of the transponder is indeed authorized, that is to say that the positioning of the finger of the user is indeed recognized by the transponder.

As a comment, the positioning of the finger of the user on the contact pads 29, 30 forms an electric connection by the conductive property of the human body, which is equivalent to positioning a certain resistance between the two contact pads 29, 30. This phenomenon will be the same irrespective of the portion of human body positioned on the two contact pads 29, 30. Advantageously, the two contact pads 29, 30 will be positioned close to one another in order to allow them to be connected with a finger, even of small dimension.

Figure 4:
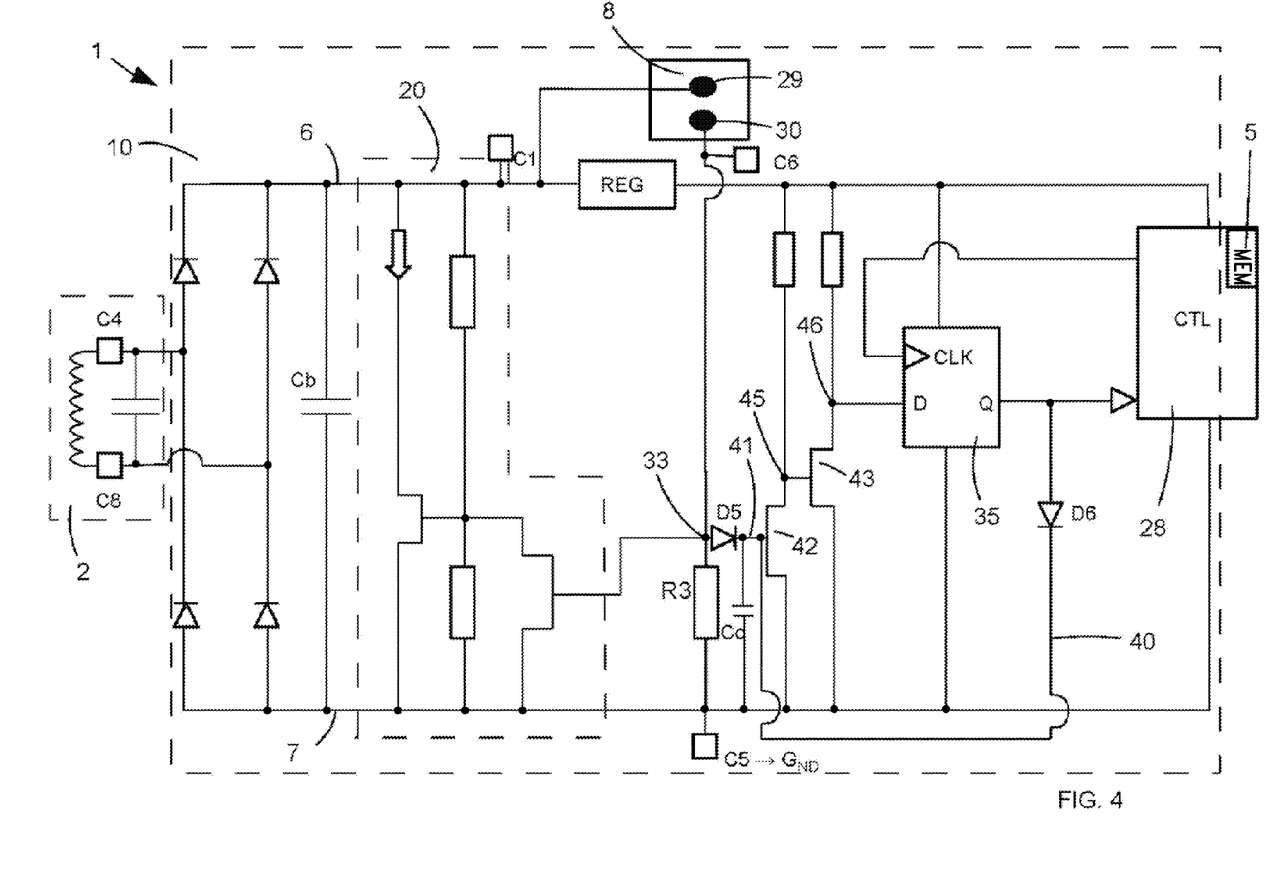
FIG. 4 represents schematically the electronic circuit of a transponder according to a first variant of the first embodiment of the disclosure.

FIG. 4 illustrates a first variant embodiment of the first embodiment, for which the circuit of the transponder is slightly modified to allow a transaction authorization by simple contact on the contact zone 8 provided on the transponder, without requiring the finger to be kept on it throughout a transaction.

For this, the second intermediate terminal 33 of the electronic circuit is also connected to the low-voltage terminal 7 of the transponder by a diode D5 and a capacitor Cc placed in series. The output Q of the flip-flop 35 is connected via an electric link 40, on which another diode D6 is placed, to a terminal 41 of the capacitor Cc. The voltage of this terminal 41 is also connected to a third switch 42, placed in series with a resistor between the high voltage 7 and low voltage 6 of the transponder downstream of the voltage regulator. An intermediate terminal 45 placed between this resistor and the third switch 42 drives a fourth switch 43 similarly placed in series with a resistor between the high voltage 7 and low voltage 6 of the transponder, delimiting a new intermediate terminal 46 connected to the input D of the flip-flop 35.

The operation of this first variant execution will now be explained. When the transponder is positioned in an electromagnetic field at its resonance frequency generated by a reader and the electric connection is obtained between the two pads 29, 30, by the positioning of a finger of the owner of the transponder on the appropriate contact zone 8, a voltage appears at the intermediate terminal 33 which induces the closure of the third switch 42 and the setting to low voltage 7 of the voltage of the intermediate terminal 45, which then opens the fourth switch 43 in order to induce a high voltage of the intermediate terminal 46 connected to the input D of the flip-flop. The latter then takes a high value and transmits an authorization signal to the microcontroller 28. The contact of a finger on the provided contact zone 8 therefore causes, in cascade, the closure of a switch 42 and the opening of another switch 43 in order finally to modify the state of the transponder 1 to the second state for authorizing its use. In this embodiment, the switches 42, 43 are transistors of the N-channel MOS type.

At the same time, the voltage on the intermediate terminal 33 causes the charging of the capacitor Cc. In addition, the output voltage of the flip-flop is connected to the terminal 41 of this capacitor, which also causes its charging, which is maintained even when the finger is removed from the contact zone 8. Through this mechanism, the voltage for controlling the third switch 42 remains sufficient, through the charging of the capacitor Cc, to keep the third switch 42 in the closed position, and by cascade effect, to keep the flip-flop in its configuration of authorizing a transaction, once there has been a simple contact on the contact zone 8 provided for this purpose at the contact pads 29, 30. As a comment, the diodes D5 and D6 then fulfil the function of preventing the capacitor Cc from discharging. The simple non-permanent contact of a portion of human body is therefore sufficient in this variant execution, which is naturally possible notably by the fact that the transponder remains powered even after the finger of the user has been removed.

Figure 5:
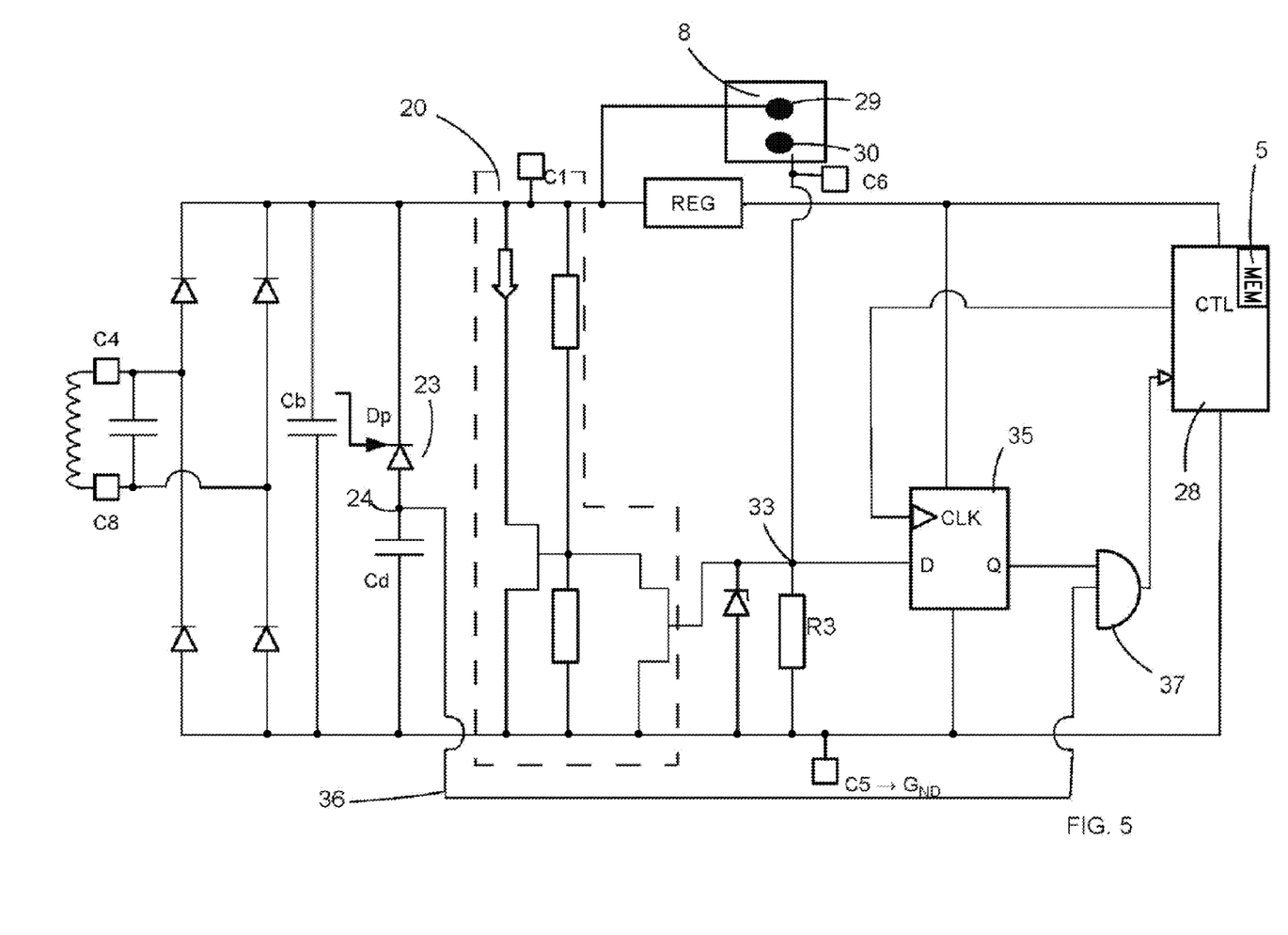
FIG. 5 represents schematically the electronic circuit of a transponder according to a second variant of the first embodiment of the disclosure.

FIG. 5 illustrates a second variant of the first embodiment, which comprises a photodiode 23 (Dp) in series with a capacitor Cd, both elements being placed between the two terminals, the high-voltage terminal 6 and the low-voltage terminal 7, of the transponder. An intermediate terminal 24 placed between the photodiode 23 and the capacitor Cd is connected to the second input of an AND logic gate 37, the output Q of the flip-flop 35 being connected to its first input. Finally, the output of the AND logic gate 37 is connected to the microcontroller 28.

The operation of this second variant will now be explained. As above, the output Q of the flip-flop takes the second high value for authorizing use of the transponder when the transponder enters the electromagnetic field of a reader and when its holder authorizes the transaction by touching the contact zone 8 provided for this purpose. However, in this embodiment, the final authorization to carry out the transaction is not transmitted to the microcontroller 28 unless the additional condition of the receipt of light by the photodiode 23 is satisfied, which has the effect of obtaining a higher voltage on the terminal 24, detected at the input of the AND logic gate 37. This solution makes it possible to prevent an unintended transaction, which could, for example, occur if a user, having, for example, his transponder 1 in his pocket, therefore in the dark, places his hand in his pocket, unintentionally presses the contact zone 8 provided for authorizing a transaction, and at the same time the transponder 1 is powered contactlessly by a reader.

Figure 6:
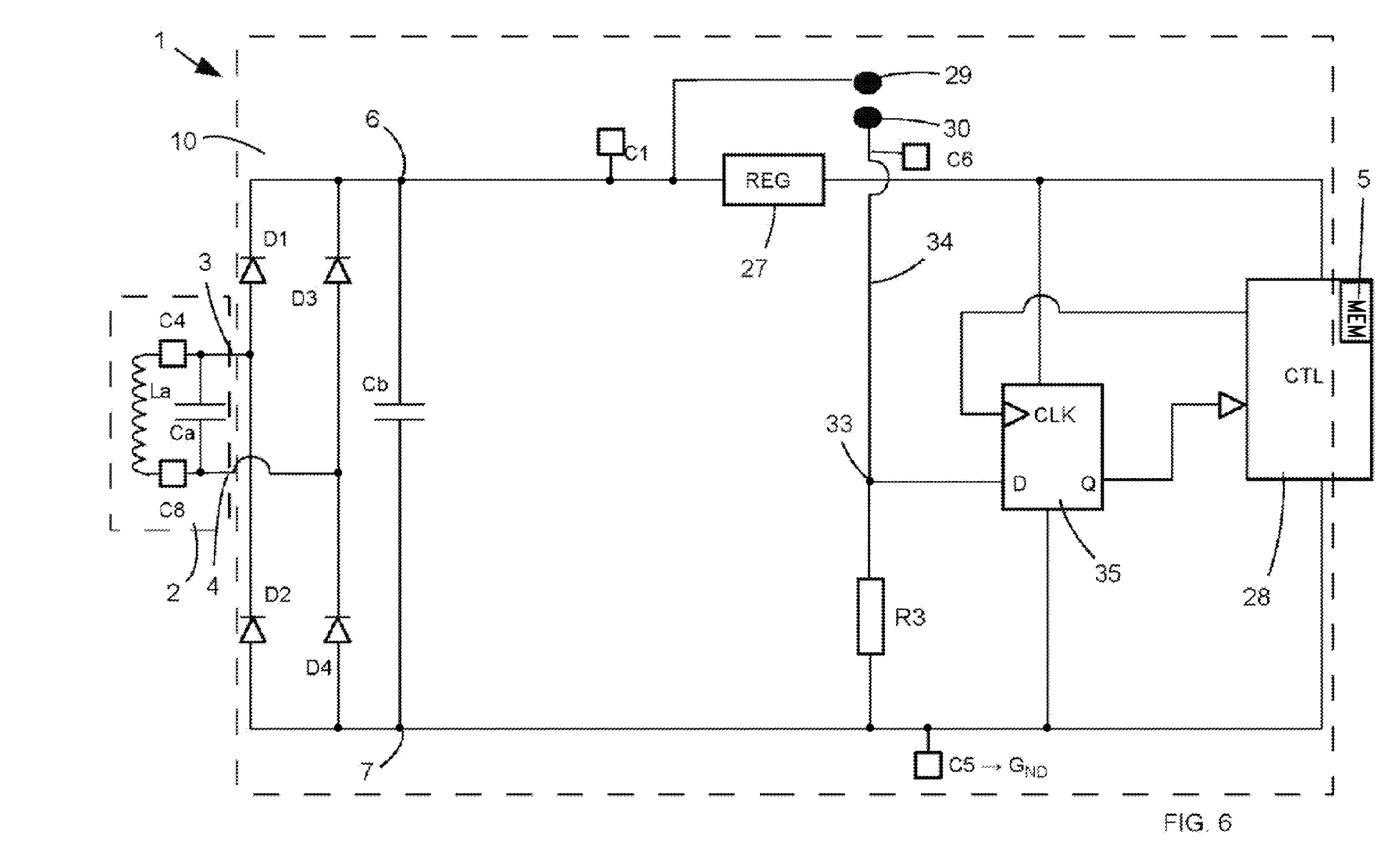
FIG. 6 represents schematically the electronic circuit of a transponder according to a third variant of the first embodiment of the disclosure.

FIG. 6 illustrates a simplified third variant of the first embodiment, in which the visual indicator function has been eliminated, the visual indicator device 20 having been removed. For the rest, the operation of the transponder 1 remains equivalent to that explained above.

Figure 7:
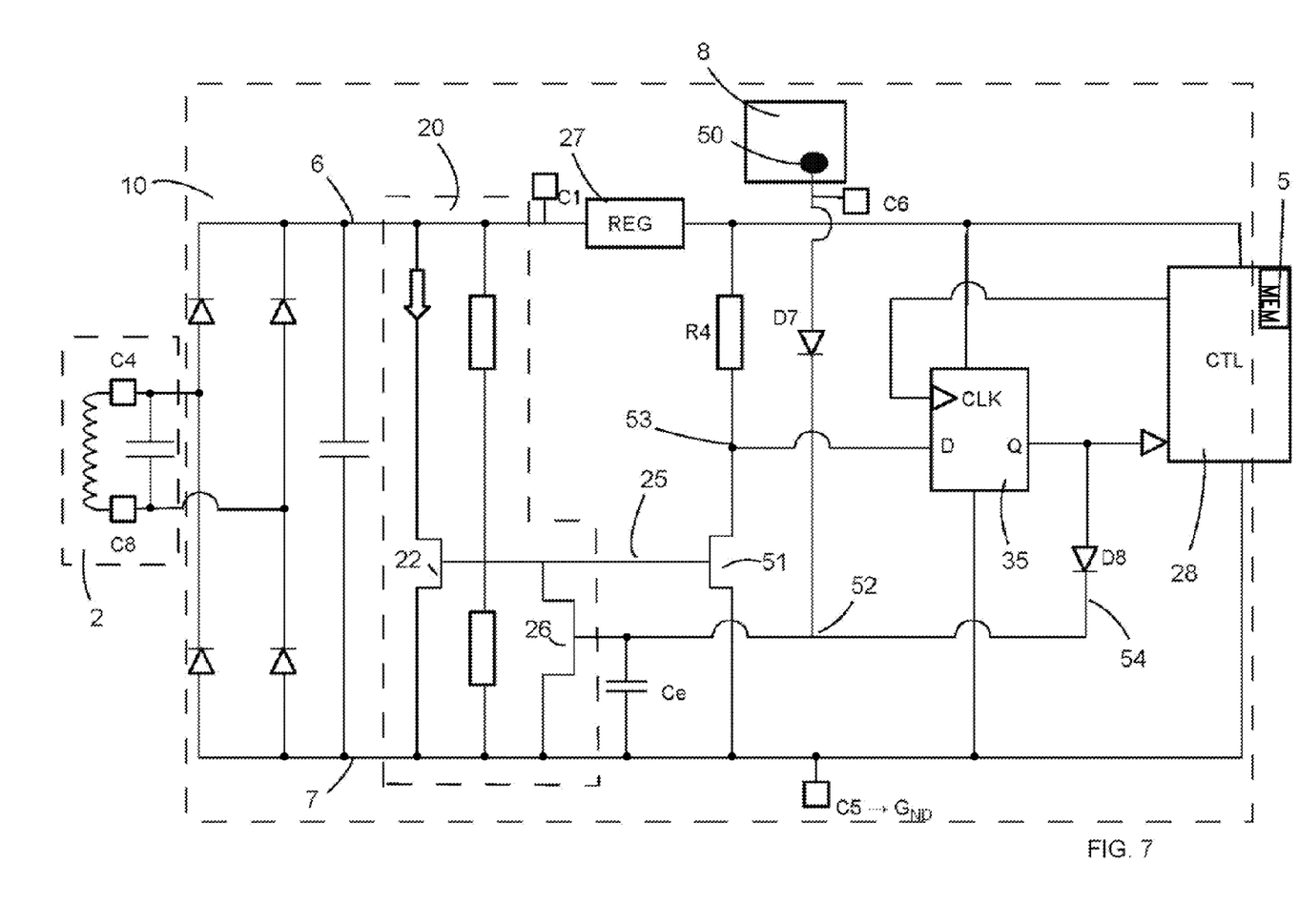
FIG. 7 represents schematically the electronic circuit of a transponder according to a second embodiment of the disclosure.
Figure 8:
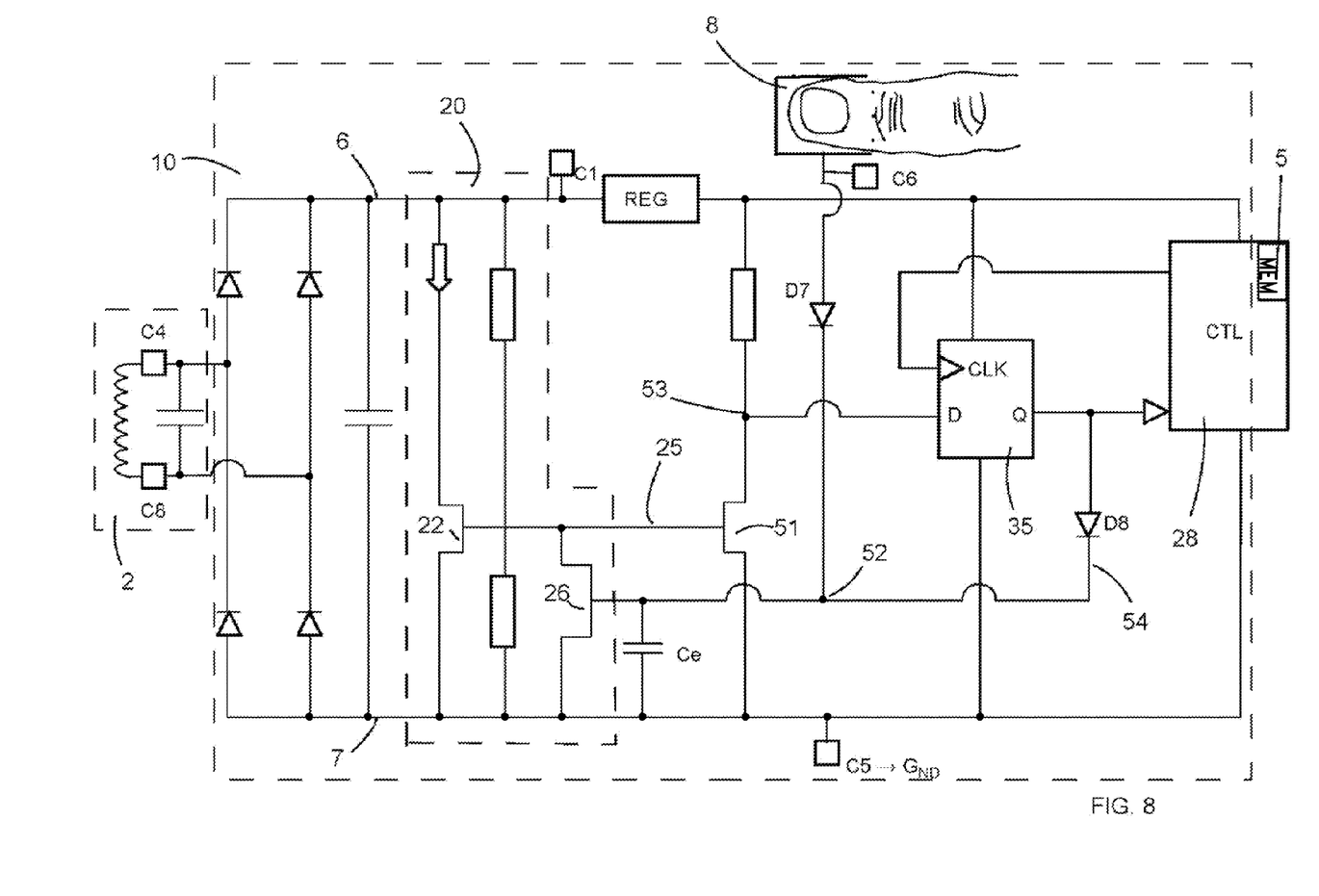
FIG. 8 represents schematically the electronic circuit of a transponder during a transaction authorized by its holder according to the second embodiment of the disclosure.

FIGS. 7 and 8 illustrate a second embodiment, in which the downstream portion of the intermediate circuit 10, mainly placed between the voltage regulator 27 and the microcontroller 28, is modified. First, a channel placed between the two terminals of voltage 6, 7 comprises a resistor R4 and a third switch 51, driven by the voltage of the intermediate terminal 25 defined by the visual indicator device 20 as explained in the first embodiment. Moreover, the voltage of an intermediate terminal 53 on this channel, situated between the resistor R4 and the third switch 51, is connected to the input D of the flip-flop 35. A channel 54 leaves the output of the flip-flop 35 and comprises a diode D8 and is then connected to the low voltage 7 of the transponder via a capacitor Ce the cathode of which defines a terminal 52, which drives the second switch 26 of the visual indicator device 20. Finally, a contact pad 50 is provided on a contact zone 8, also connected to this terminal 52, by a channel comprising a diode D7.

The operation of this second embodiment will now be explained. When the transponder 1 is powered contactlessly by a reader, a voltage appears on the intermediate terminal 25, which closes the third switch 51, thus placing the voltage of the intermediate terminal 53 in connection with the low voltage 7 of the transponder. The input D of the flip-flop 35 is thus connected to a low voltage and transmits as an output Q, at the low value, a signal to the microcontroller 28 which is interpreted as the non-authorization of the use of the transponder. The latter is therefore in a first state of not authorizing its use in its representation of FIG. 7.

When a user positions a finger on the contact pad 50, as shown in FIG. 8, he forms a capacitive effect which, by modifying the voltage value of the terminal 52, closes the second switch 26, placing the voltage of the intermediate terminal 25 in connection with the low voltage 7 of the transponder. This value drives the opening of the third switch 51 and a high voltage appears at the intermediate terminal 53, transmitted as an input D of the flip-flop 35, which allows the output Q of the flip-flop 35 to take its high value, on the next rising (or falling) edge of the clock signal, and to take the second value, interpreted by the microcontroller as the authorization of the transaction. At the same time, the output voltage of the flip-flop makes it possible to maintain the charge of the capacitor Ce at a sufficient value to keep the voltage of the terminal 52 at a value that keeps the second switch 26 closed, via the return channel 54, through the diode D8. The diodes D7 and D8 then fulfil the function of preventing the capacitor Ce from discharging. In a variant embodiment, this capacitor Ce could be removed because the intrinsic capacitor (internal gate-source capacitor) of the N-channel MOS transistor forming the switch 26 could be sufficient to fulfil the same function.

Finally, a simple touch on the contact pad 50 by the user is enough to reach this second state of the transponder in which its communication with a reader is authorized. This state then remains stable, even if the finger of the user is removed. As a comment, when this touch of the user has been recognized, the voltage of the intermediate terminal 25 takes its low value and the first switch 22 opens causing the visual indicator 21 to switch off, which thus indicates, as in the first embodiment, that the authorization of the user has been recognized.

In this second embodiment, the positioning of the finger of the user on the contact pad 50 provides a certain charge to the pad 50, which, by capacitive effect, makes it possible to charge a capacitor, for example the capacitor Ce in the embodiment shown in FIGS. 7 and 8. This phenomenon would be the same irrespective of the portion of human body positioned on the contact pad 50.

In the context of an implementation on an integrated circuit card, of the payment card type, which is thin, one or two contact pads made of conductive material will be arranged in a surface layer of the card, in a contact zone 8, superposed on the contact pads of the electronic circuit, in order to form an electric continuity and allow an interaction of the user with the integrated circuit placed in an intermediate layer in the thickness of the card. To make the card easier to use, the contact zone 8 on which the user positions himself in order to make the electric connection with the contact pad(s) of the electronic circuit and authorize a transaction will advantageously be made clear, for example, with the aid of a portion coloured differently from the rest of the card, and/or comprising a particular design, such as that of a finger, for example.

Figure 9:
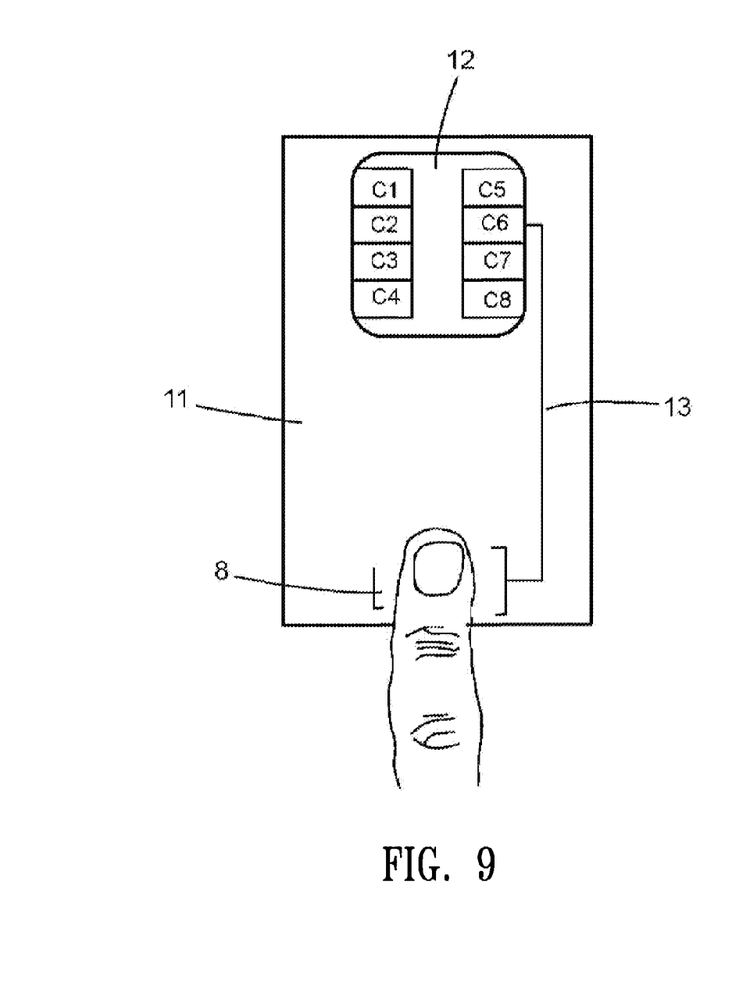
FIG. 9 represents the top surface of an integrated circuit card of dual type, with and without contact, according to one embodiment of the disclosure.

A dual card, that is to say a card that can operate with contact and without contact, in order to allow use by insertion into a reader for a communication with contact by means of an electric connector, or a use without contact as described above, comprises a surface connector with contact zones in a position and a geometry that are standardized. FIG. 9 illustrates such a dual card 11 the connector 12 of which has eight contacts C1 to C8, and an antenna not shown. In the particular case of such a card, it is possible to make use of the presence of these surface contact zones to make it easier to implement the contact zone 8 designed for authorization by its holder, as has been described in the preceding embodiments. As an example, FIG. 9 shows how the contact pad 50 of the contact zone 8 can be arranged on the surface and connected to the rest of the electric circuit by a simple connection to the contact C6 already provided on the card and not used in this embodiment, by means of a connection 13 which makes it possible to place this contact zone 8 in the desired location on the surface of the card. As a comment, a few contacts C1, C4, C5, C6, C8 are positioned on the circuits of the transponders illustrated in FIGS. 2 to 8 to represent the electric connection between the contacts concerned and the portions of the electric circuit when the transponders 1 shown are in fact integrated circuit cards. In the context of the first embodiment, it therefore appears that the contact pads 29, 30 could be respectively connected to the contacts C1, C6 of the card, for example.

Naturally, the embodiments described above can be easily adapted to all types of transponders which can occur in various formats, such as contactless or dual integrated circuit cards and/or incorporated into electronic devices such as telephones, personal organizers, etc. In the particular case of a device such as a telephone, the contact zone may be arranged within the casing of the device, or even be arranged within a screen that already exists on the device. The advantage of providing an independent contact zone is that it allows it to operate independently of the battery of the device, even if this battery has no charge left. Moreover, the embodiments described can be implemented in transponders communicating according to the technology known as NFC (Near Field Communication), or more generally for short-distance contactless communications at a frequency of between 10 and 15 MHz, or for any inductive coupling. Moreover, such a transponder may or may not comprise an internal electric power supply, be intelligent, comprise one or more microprocessors, or comprise a much simpler structure of simple wired logic, more or less elementary, such as to form simple electronic labels, often called electronic "tags". Those skilled in the art will therefore understand that the intermediate circuit 10 may take very varied forms depending on the type of transponder concerned.

The contact pads for receiving a portion of human body could be placed differently within the intermediate circuit 10 between the resonant circuit 2 and the memory 5 of the transponder. For example, the contact pad 29 could be connected downstream of the voltage regulator 27, in which case the security Zener diode 32 would become unnecessary. Similarly the effect of transmitting authorization to a microcontroller or any other component for access to a memory could be obtained by components other than a flip-flop, for example any other device based on one or more logic gates. Moreover, the switches implemented in the embodiments described are transistors of the N-channel MOS type, but as a variant, there could be another type of transistor, a P-channel transistor for example, or more generally any component other than transistors fulfilling a switch function.

As a comment, the effects obtained and explained above by the positioning of a portion of human body on a contact zone provided for this purpose on the transponder are of resistive or capacitive type, that is to say that the portion of human body makes it possible to form either an electric resistance or a capacitance or a contribution of charge, within the electronic circuit of the transponder, the first effect of which is to induce a change of voltage on a particular terminal of the transponder, and to modify the configuration of the electronic circuit of the transponder to authorize a transaction. A second worthwhile effect consists in inducing a switching of a switch, as has been illustrated in the implementation examples described. These effects are not very dependent on the electric properties of the portion of human body, do not require a precise value of resistance or of capacitance, and operate well in all conditions, with any person, irrespective of the ambient humidity, etc.

In the embodiments described previously and their variants, the visual indicator device 20 may be eliminated so as to readily obtain simplified variant embodiments without visual indicators, as illustrated by FIG. 6, operation of which remains similar.

Finally, other execution variants may be imagined in the context of the concept described, for example by the simple combination of the embodiments described above. Thus, the context of the protection sought goes beyond the embodiments described as examples and includes modifications and enhancements.

For example, the above discussion describes contacting the contact zone 8 with a portion of the human body in order to fully activate the transponder 1, but one skilled in the art will recognize that other objects could be employed to contact the contact zone 8 and activate the transponder 1. For example, the user could contact the contact zone 8 using a conductive item, such as a capacitive stylus, or other device capable of changing the resistance or capacitance of the intermediate circuit 10.

The disclosure also relates to a system comprising a reader, such as the reader 9 of FIG. 1, furnished with an oscillating circuit at a certain resonance frequency and comprising a transponder as described above, the resonant circuit of which has a resonance frequency tuned to that of the reader, in order to be able to be powered contactlessly by the reader and allow a contactless communication.

The disclosure also relates to a method of contactless communication between a reader and a transponder as described above, which comprises the following steps, according to one embodiment of the disclosure:

a. transmission of an electromagnetic field by the reader;

b. resonance of the resonant circuit of the transponder inducing the contactless powering of the transponder, which is in a first state in which it does not allow the reading and/or writing of the memory (5) and transmits no datum or random data;

c. positioning of a portion of human body on a contact zone of the intermediate circuit of the transponder and switch to a second state of the transponder;

d. interchange of data between a memory of the transponder and the reader.

This method of contactless communication can allow the interchange of data for carrying out, for example, a contactless electronic payment and/or an authentication, and/or a digital signature sent to the reader and/or a simple secure data interchange.

Figure 10:
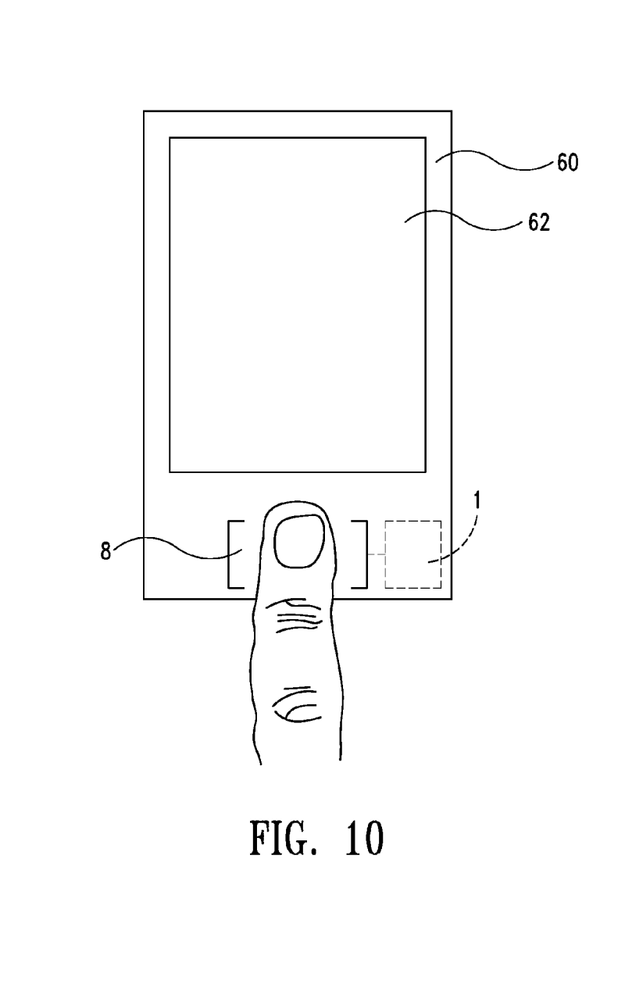
FIG. 10 is a portable telephone according to one embodiment of the disclosure.

One embodiment of the disclosure is a portable device, such as a telephone 60 as shown in FIG. 10. In FIG. 10, the telephone 60 is shown as including a touch screen 62 in addition to the transponder 1 according to any of the embodiments disclosed herein, including the contact zone 8. One skilled in the art will recognize that the contact zone 8 could be incorporated into a portion of the touch screen 62.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transponder comprising:
a resonant circuit that includes an antenna and a capacitor;
a memory; and
an intermediate circuit that includes a contact zone configured to be contacted by a portion of human body, the intermediate circuit being configured to switch from a first state, in which the intermediate circuit does not allow the memory to be accessed, to a second state in which the intermediate circuit allows the memory to be accessed when the resonant circuit of the transponder is contactlessly powered by a reader, the intermediate circuit including:
an intermediate terminal coupled to the contact zone and configured such that the positioning of the portion of human body on the contact zone changes a voltage of the intermediate terminal; and
a flip-flop coupled to the intermediate terminal and configured to switch an output value in response to the portion of human body contacting the contact zone.

2. A transponder according to the claim 1, wherein the resonant circuit is configured to be powered contactlessly around a resonance frequency that remains the same in both states of the intermediate circuit.

3. A transponder according to claim 2, wherein the resonant circuit is configured to resonate and induce a voltage difference between a high terminal and a low terminal when the transponder is contactlessly powered by a reader, in both states of the intermediate circuit.

4. A transponder according to claim 1, wherein the contact zone includes a contact pad on which the positioning of a portion of human body has a capacitive effect, or includes two adjacent contact pads on which the positioning of a portion of human body has a resistive effect.

5. A transponder according to claim 1, wherein the intermediate circuit is configured to switch from the first state to the second state in response to a the portion of human body being placed on the contact zone.

6. A transponder according to claim 1, wherein the intermediate circuit includes a switch configured to pass from an open to a closed position or vice versa by the positioning of the portion of human body on the contact zone.

7. A transponder according to claim 1, wherein the intermediate circuit includes a capacitor coupled by a return pathway from an output of the flip-flop and configured to maintain its charge after the portion of human body is removed from the contact zone.

8. A transponder according to claim 1, wherein the intermediate circuit includes an indicator configured to display that the transponder is contactlessly powered by a reader and/or to display that positioning of the portion of human body on the contact zone has been or is taken into account.

9. A transponder according to claim 1, wherein the transponder is a contactless or dual integrated circuit card.

10. A transponder comprising:
a resonant circuit that includes an antenna and a capacitor;
a memory and
an intermediate circuit that includes a contact zone configured to be contacted by a portion of human body, the intermediate circuit being configured to switch from a first state, in which the intermediate circuit does not allow the memory to be accessed, to a second state in which the intermediate circuit allows the memory to be accessed when the resonant circuit of the transponder is contactlessly powered by a reader, the intermediate circuit including:
a photodiode configured to light up when the resonant circuit of the transponder is contactlessly powered by a reader, the intermediate circuit being configured to switch from the first state to the second state in response to positioning of the portion of human body on the contact zone, if there is sufficient power to light up the photodiode.

11. A transponder according to the claim 10, wherein the intermediate circuit includes:
an intermediate terminal coupled to the contact zone and configured such that the positioning of the portion of human body on the contact zone changes a voltage of the intermediate terminal; and
a flip-flop coupled to the intermediate terminal and configured to switch an output value in response to the portion of human body contacting the contact zone.

12. A telephone, comprising:
a transponder that includes:
a resonant circuit that includes an antenna and a capacitor;
a memory; and
an intermediate circuit that includes a contact zone configured to be contacted by a portion of human body, the intermediate circuit being configured to switch from a first state, in which the intermediate circuit does not allow the memory to be accessed, to a second state in which the intermediate circuit allows the memory to be accessed when the resonant circuit of the transponder is contactlessly powered by a reader, the intermediate circuit including:

an intermediate terminal coupled to the contact zone and configured such that the positioning of the portion of human body on the contact zone changes voltage of the intermediate terminal; and a flip-flop coupled to the intermediate terminal and configured to switch an output value in response to the portion of human body contacting the contact zone.

13. A telephone according to the claim 12, wherein the resonant circuit is configured to be powered contactlessly around a resonance frequency that remains the same in both states of the intermediate circuit.

14. A telephone according to the claim 12, wherein the intermediate circuit is configured to switch from the first state to the second state in response to the portion of human body being placed on the contact zone.

15. A telephone according to the claim 12, wherein the intermediate circuit includes a switch configured to pass from an open to a closed position or vice versa by the positioning of the portion of human body on the contact zone.

16. A system, comprising:
a reader configured to oscillate at a resonance frequency; and
a transponder that includes:
a resonant circuit that includes an antenna and a capacitor, the resonant circuit having a resonance frequency substantially equal to the resonance frequency of the reader;
a memory; and
an intermediate circuit that includes a contact zone configured to be contacted by a portion of human body, the intermediate circuit being configured to switch from a first state, in which the intermediate circuit does not allow the memory to be accessed, to a second state in which the intermediate circuit allows the memory to be accessed when the resonant circuit of the transponder is contactlessly powered by a reader, the intermediate circuit including:
an intermediate terminal coupled to the contact zone and configured such that the positioning of the portion of human body on the contact zone changes a voltage of the intermediate terminal; and
a flip-flop coupled to the intermediate terminal and configured to switch an output value in response to the portion of human body contacting the contact zone.

17. A system according to the claim 16, wherein the resonant circuit is configured to be powered contactlessly around the resonance frequency that remains the same in both states of the intermediate circuit.

18. A system according to the claim 16, wherein the intermediate circuit is configured to switch from the first state to the second state in response to the portion of human body being placed on the contact zone.

19. A system according to the claim 16, wherein the intermediate circuit includes a switch configured to pass from an open to a closed position or vice versa by the positioning of the portion of human body on the contact zone.

* * * * *